(12) United States Patent
Redd

(10) Patent No.: US 9,078,403 B2
(45) Date of Patent: Jul. 14, 2015

(54) DIODE DEVICE AND METHOD FOR REPAIRING SPRINKLER SYSTEM WITH FAULTY WIRING BETWEEN CONTROL BOX AND VALVE

(71) Applicant: Matthew J. Redd, Pleasant Grove, UT (US)

(72) Inventor: Matthew J. Redd, Pleasant Grove, UT (US)

( * ) Notice: Subject to any disclaimer, the term of this patent is extended or adjusted under 35 U.S.C. 154(b) by 525 days.

(21) Appl. No.: 13/644,892

(22) Filed: Oct. 4, 2012

(65) Prior Publication Data

US 2013/0092853 A1 Apr. 18, 2013

Related U.S. Application Data

(60) Provisional application No. 61/546,352, filed on Oct. 12, 2011.

(51) Int. Cl.
*F16K 31/02* (2006.01)
*A01G 25/16* (2006.01)
*H01R 43/00* (2006.01)

(52) U.S. Cl.
CPC .......... *A01G 25/16* (2013.01); *Y10T 29/49117* (2015.01)

(58) Field of Classification Search
CPC .......................... A01G 25/16; Y10T 29/49117

USPC ........................................ 307/42; 137/487.5
See application file for complete search history.

(56) References Cited

U.S. PATENT DOCUMENTS

| 6,932,277 | B1* | 8/2005 | Ericksen et al. | 239/1 |
| 2011/0120564 | A1* | 5/2011 | Hilton et al. | 137/2 |
| 2011/0232770 | A1* | 9/2011 | Baggett | 137/12 |

* cited by examiner

*Primary Examiner* — Jared Fureman
*Assistant Examiner* — Emmanuel R Dominique
(74) *Attorney, Agent, or Firm* — Workman Nydegger

(57) ABSTRACT

The present invention is directed to methods of repairing a sprinkler system with faulty wiring between the controller and a one or more of the valves, and associated repaired systems. The method includes identifying the faulty electrically conductive line having electrical discontinuity between the controller and a corresponding first valve, and identifying a non-faulty electrically conductive line having electrical continuity between a controller and corresponding second valve. Control over the first valve is achieved by sharing the non-faulty electrically conductive line between the second valve and the first valve. Forked wiring segments are inserted on both the controller end and the valve end of the non-faulty line. Each inserted wire segment includes a diode to permit current to flow in only one direction allowing both valves to be controlled through only a single shared "hot" line.

10 Claims, 5 Drawing Sheets

DIODE DEVICE AND METHOD FOR REPAIRING SPRINKLER SYSTEM WITH FAULTY WIRING BETWEEN CONTROL BOX AND VALVE

CROSS-REFERENCE TO RELATED APPLICATIONS

The present application claims the benefit of U.S. Patent Application Ser. No. 61/546,352, filed Oct. 12, 2011, entitled "DIODE DEVICE AND METHOD FOR REPAIRING SPRINKLER SYSTEM WITH FAULTY WIRING BETWEEN CONTROL BOX AND VALVE", the disclosure of which is incorporated by reference in its entirety.

BACKGROUND OF THE INVENTION

1. The Field of the Invention

The present invention is in the field of sprinkler system installation and repair, more particularly, a diode device and a method for repairing a sprinkler system including faulty wiring between a control box and a valve.

2. The Relevant Technology

Automatic irrigation systems such as those used for landscaping (particularly in relatively arid climates) and agricultural applications are commonly known technology. Such systems generally employ sprinkler systems in which a plurality of solenoid-controlled valves are each controlled by an automatic controller (e.g., a control box) through which the user may control timing, sequence, and other characteristics of the system. The control box may selectively pass generated signals through a wiring network to the corresponding solenoid controlled valve to actuate a desired valve. Control of the various valves is independent, so that one valve may be singled out for actuation at a desired time.

A sprinkler system typically includes valves connected to and which control water flow through piping so that the water can be delivered in a controlled manner from a source (e.g., irrigation water) through a feed pipe to a control valve, which controls when water can flow from the feed pipe to another pipe and to a sprinkler head which delivers the water to lawn or other plants in the landscaping.

Generally, the wiring network or system between the controller and the plurality of valves includes a so-called "hot" line running from the controller to the associated valve, as well as a so-called "common" line that runs from the controller to one of the valves, which is then coupled to each of the other valves. In other words, a single common line runs from the controller to each valve, while a hot line is dedicated to running between the control box and the associated valve. For example, a system including 3 valves would include 3 hot lines (one for each valve) and a single common line running from the controller to one valve, which connects to the second valve, which then connects to the third valve. FIG. 1 shows this configuration.

Faulty wiring between the control box and the valves disrupts these signals resulting in one or more valves becoming inoperable. For example, when a particular valve of a sprinkler system stops working, this is often the result of the hot wire associated with that valve having a short or otherwise being faulty. Generally, repairing such wiring problems of the sprinkler system can be expensive, complicated, and time consuming. For example, often the homeowner's landscaping or other area serviced by the sprinkler system (e.g., a golf course or agricultural field) must be dug-up to replace or repair the faulty wiring. The field would benefit from a quick, convenient, and inexpensive method of repairing such faulty wiring.

BRIEF SUMMARY

The present invention is directed to methods and systems of repairing a sprinkler system with faulty wiring between the controller and a one or more of the valves. Disclosed is a method of repairing a faulty sprinkler system in which a hot electrically conductive line between a controller and a corresponding valve is faulty. The method includes identifying the faulty electrically conductive line having at least one electrical discontinuity between the controller and a corresponding first valve, and identifying a non-faulty electrically conductive line having electrical continuity between a controller and corresponding second valve.

The method further includes inserting a forked electrically conductive line including three segments into one end of the non-faulty electrically conductive line adjacent the controller, between the controller and the corresponding second valve. The forked electrically conductive line includes a first segment providing an electrical connection to the controller for the first valve, a second segment providing an electrical connection to the controller for the second valve, and a third segment that provides an electrical connection to the non-faulty electrically conductive line. The first and second segments each include an electrical diode between the controller and the non-faulty electrically conductive line, which allows the non-faulty electrically conductive line to be shared by two valves without interference between the valves.

The method further includes inserting a forked electrically conductive line including three segments into another end of the non-faulty electrically conductive line, adjacent to the second valve. Similar to the other forked line, this forked electrically conductive line includes a first segment providing an electrical connection between the non-faulty electrically conductive line and the first valve, a second segment providing an electrical connection between the non-faulty electrically conductive line and the second valve, and a third segment that provides an electrical connection between the non-faulty electrically conductive line and the forked first and second segments. The first and second segments each include an electrical diode between the corresponding valve and the non-faulty electrically conductive line.

Another embodiment of the present invention is directed to an associated sprinkler system including a controller for controlling a plurality of sprinkler valves, a first hot electrically conductive line having electrical continuity between the controller and a corresponding first valve, a second hot electrically conductive line having electrical continuity between the controller and a corresponding second valve, and a common electrically conductive line having electrical continuity between the controller, the first valve, and the second valve. Both the first and second hot electrically conductive lines include a first segment, a second segment, and a third segment. The first segment of each line electrically connects the controller to the associated second segment of each line, the second segment of each line electrically connects the associated first segment to the associated third segment, and the third segment electrically connects the associated second segment to the associated valve (i.e., the third segment of the first line electrically connects the second segment of the first line to the first valve, while the third segment of the second line electrically connects the second segment of the second line to the second valve).

The second segment of the second hot electrically conductive line is also the second segment of the first hot electrically conductive line, so that the second segment includes forks at both the controller end and the valve end. In other words, the second segment is shared between the first and second lines.

The system further includes a plurality of electrical diodes including a pair of first segment diodes and a pair of third segment diodes in which a first segment diode is disposed on each first segment between the controller and the fork at the intersection of the second segment with the first segments. Similarly, the third segment diodes are disposed on each third segment between the corresponding valve and the fork at the intersection of the second segment with the third segments.

The systems and methods of the present invention advantageously allow a single hot wire that is not faulty to be shared between two adjacent valves within a sprinkler system. For example, if it is determined that one of the hot wires from the controller to a valve box containing a plurality of valves has gone bad, one of the good wires associated with another of the valves within that valve box can be shared to control two valves (i.e., its regularly assigned valve as well as the valve associated with the faulty line). This can advantageously be accomplished by simply splicing 3-segment electrically conductive line including diodes at each of the 2 forks into both ends of the non-faulty line, attaching one of the forks to the position on the controller associated with the regularly assigned valve, and attaching the other fork to the position on the controller associated with the faulty line. A similar connection is made at the opposite end of the non-faulty line, near the valve box by attaching one of the forks (at the valve side) to the regularly assigned valve, and attaching the other fork to the valve associated with the faulty line. Thus, the faulty line can simply be abandoned, and the non-faulty line, with the attached forked connections at each end can act as replacement These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
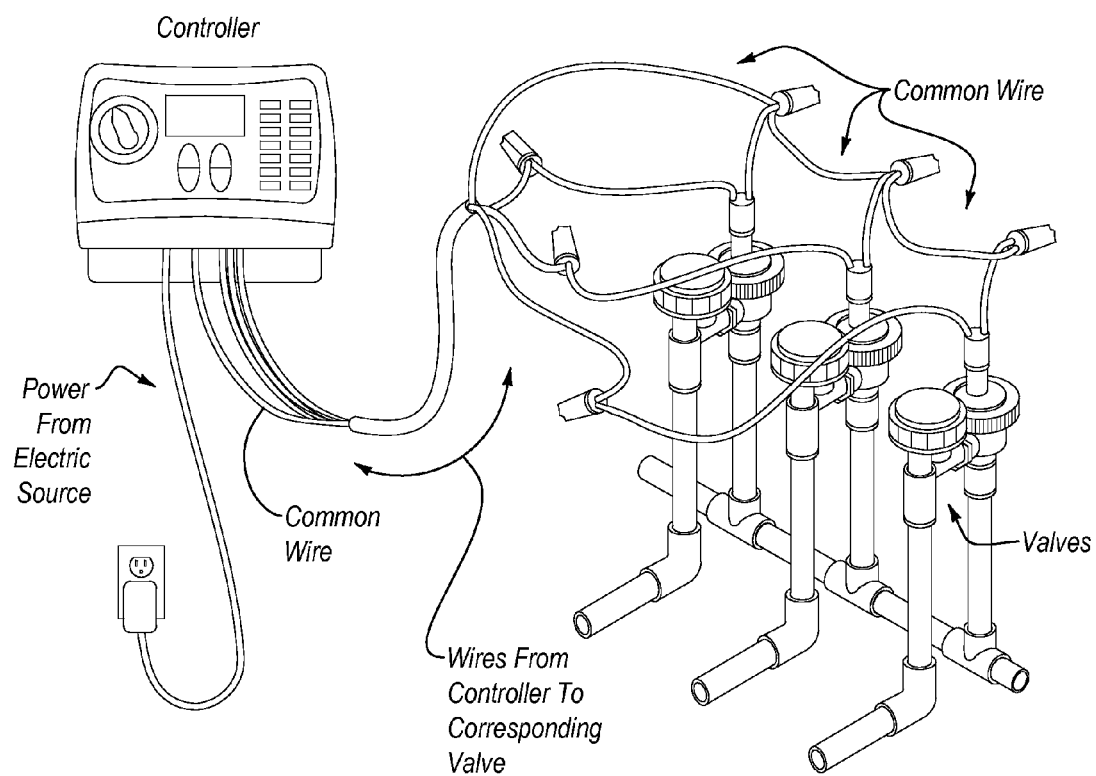
FIG. 1 illustrates a schematic of a sprinkler system including a controller and plurality of sprinkler valves connected to one another through a wiring system.

FIG. 1 illustrates a general schematic of a sprinkler system including a controller (e.g., a computerized controller) and plurality of sprinkler valves connected to one another through a wiring system. The controller may include a processor based control system, and a connection to an electric power source, as shown. The controller may be any conventional sprinkler controller as known in the art. A plurality of remotely disposed sprinkler valves are connected to the controller by general-purpose wire of sufficient gauge to conduct the required current for the specified distance. The wiring system includes a common wire that electrically connects the controller to a first valve. The common wire also connects the first valve to the second valve, and the common wire also connects the second valve to the third valve. Where the sprinkler system includes additional valves, they are similarly connected. A second wire (i.e., a "hot" wire) is associated with each valve of the system as shown, so that a dedicated "hot" wire runs from the controller directly to the valve. The number of "hot" wires provided in the wiring system is thus equal to the number of valves controlled by the controller. Thus a circuit is completed from the controller to the valve through the dedicated "hot" wire in one direction (e.g., to the valve) and the "common" wire in the other direction (e.g., returning from the valve to the controller).

Figure 2:
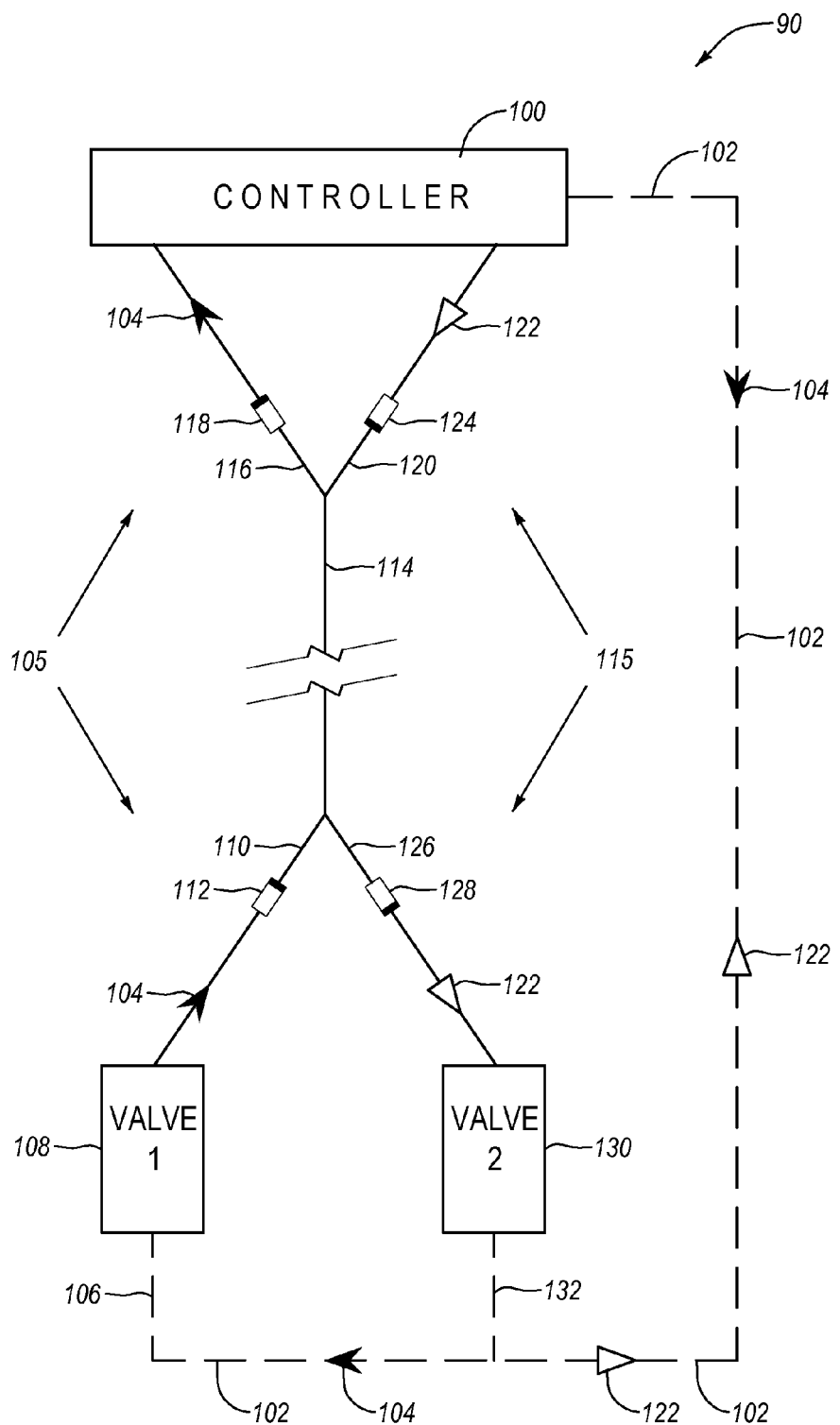
FIG. 2 is a schematic of one embodiment of the inventive system which allows control of two vales over a single "hot" electrically conductive line.

Illustrated in FIG. 2 is a schematic of one embodiment of the inventive system 90 that may be derived from a system similar to that shown in FIG. 1, but only shows two valves for the sake of simplicity. In other words, the system shown in FIG. 2 may begin as a system as shown in FIG. 1, but only including two valves. Such a sprinkler system may be modified to share a single "hot" wire between two valves, as shown in FIG. 2. FIG. 2 shows a system including a controller 100 and valves 108 and 130. A common electrically conductive line 102 connects controller 100 with valve 130 (e.g., through wire segment 132) and connects controller 100 with valve 108 (e.g., through wire segment 106). A first "hot" electrically conductive line 105 connects controller 100 to valve 108, while a second electrically conductive line 115 connects controller 100 to valve 130. While each "hot" line shown in FIG. 1 (as a sprinkler system is traditionally wired) is dedicated to one and only one valve, the hot lines 105 and 115 of FIG. 2 each include 3 segments, in which typically the vast majority of the length of each of the lines is a shared segment 114.

For example, hot line 105 includes segments, 110, 114, and 116 to electrically connect controller 110 and valve 108. Segment 110 electrically connects controller 100 with segment 114, while segment 116 electrically connects segment 114 with valve 108. Both segments 110 and 116 may be relatively short as compared to the length of segment 114. For example, segments 110 and 116 may simply be short (e.g., about 6 inches to about 3 feet) connecting segments that are electrically connected to much longer segment 114 (e.g., which may run substantially the entire distance between the controller and the valve, for example 50 feet, 100 feet, or more). Segment 114 may be an identified non-faulty hot electrically conductive line that is to be shared between two valves 108 and 130. The other hot electrically conductive line (which would have been dedicated to one of valves 108 or 130) is not shown, as it is an identified faulty electrically conductive line that is being abandoned in the repair of the system.

In a similar manner as hot line 105, hot line 115 includes 3 segments—126, 114, and 120. The vast majority of hot line 115 is segment 114, which is the identified non-faulty hot electrically conductive line, while segments 126 and 120 connect either end of segment 114 with valve 130 and controller 100, respectively. As segment 114 is shared between both hot lines 105 and 115, it is important to provide a way to independently control one of valves 108, 130 without interfering with control of the other valve. In other words, one wants to be able to turn only one of the two valves on or off at any given time without turning the other valve on or off.

This is accomplished by providing a plurality of diodes to control flow of current (and thus signal) through the hot lines 105 and 115 so that only one of the two hot lines sharing segment 114 are used at any given time. Segments 116 and 120 include diodes 118 and 124, respectively. Segments 110 and 126 include diodes 112 and 128, respectively. Thus, hot electrically conductive line 105 includes diodes 112 and 118 within segments 110 and 116 at opposed forked ends of segment 114.

A similar configuration is provided at the valve end of hot lines 105 and 115, in which diode 112 is provided within segment 110, and diode 128 is provided in segment 126. In one embodiment, the two diodes within hot line 105 are oriented in the same direction (e.g., so as to allow flow only in the direction towards controller 100), while the two diodes within hot line 115 are oriented in the same direction as one another, but in an opposite direction relative to diodes 112 and 118 (e.g., so as to allow flow only in the direction towards valve 130).

Once the segments 116, 120, 110, and 126 have been inserted with their associated diodes, the repair is complete, and full electrical conductivity and control is re-established to both valve 108 and valve 130. Referring to the wiring circuit for valve 108, in FIG. 2, direct current (designated by arrow 104) supplied by the controller 100 flows from the controller through common wire line 102 along the line in the direction of indicator 104. Line 102 is connected to segment 106 which actuates the solenoid within valve 108. Segment 110 connects valve 108, in the direction of indicator 104, through diode 112. Diode 112 only permits current flow in this direction. Segment 110 is electrically connected to segment 114. Segment 114 is in turn electrically connected to segment 116, where diode 118 only allows current (and thus signal) flow in the direction of arrow 104. Segment 116 is electrically connected to controller 100, which completes the electrical circuit between controller 100 and valve 108. Even though the wiring schematic shows the connection running "backward" (i.e., through the common line rather than the hot line to reach valve 108), the inventor has observed that control of the sprinkler valves is not dependent on direction of current flow, and the wiring system works just as well as if a dedicated line were provided for each valve. This is believed to occur because actuation of the solenoid of such sprinkler valves is not dependent on direction of current flow.

More particularly, and as will be apparent to those of skill in the art, each diode (e.g., diode 112) includes a cathode and an anode, and current flows into the diode at the location of the cathode, and out of the diode at the location of the anode. Current flow is only possible in one direction through the diode.

The electrical circuit for valve 130, is also shown in FIG. 2. The circuit begins with direct current supplied by the controller 100 to segment 120 in the direction of indicator arrow 122. Segment 120 includes diode 124. Segment 120 is electrically connected to shared segment 114. Segment 114 is in turn electrically connected to segment 126 which includes diode 128. Diodes 124 and 128 are shown oriented in the same direction as each other (i.e., to allow current flow only in a direction 122 toward valve 130). This orientation is opposite that of diodes 118 and 112 in the other hot line for controlling valve 108. Segment 126 further electrically connects to valve 130. valve 130 is electrically connected to common wire line 102 via segment 132. Current and signal is able to flow in direction 122 over common line 102 to controller 100 to complete the circuit to actuate valve 130.

Diode devices including segment 116, diode 118, segment 120, diode 124, and a portion of segment 114 may be provided for insertion into the wiring system of a sprinkler system. In one embodiment, at least the diodes (and optionally portions of segments 116, 120, and 114) may be encased within a water tight housing (e.g., silicone or other waterproof material). Such a water-tight device may be particularly beneficial where the device is to be inserted into an end of the wiring system adjacent the valves of the system (e.g., in a valve box, where a plurality of valves are disposed adjacent to one another, often below ground level, where they may sometimes be submerged in water).

Figure 4:
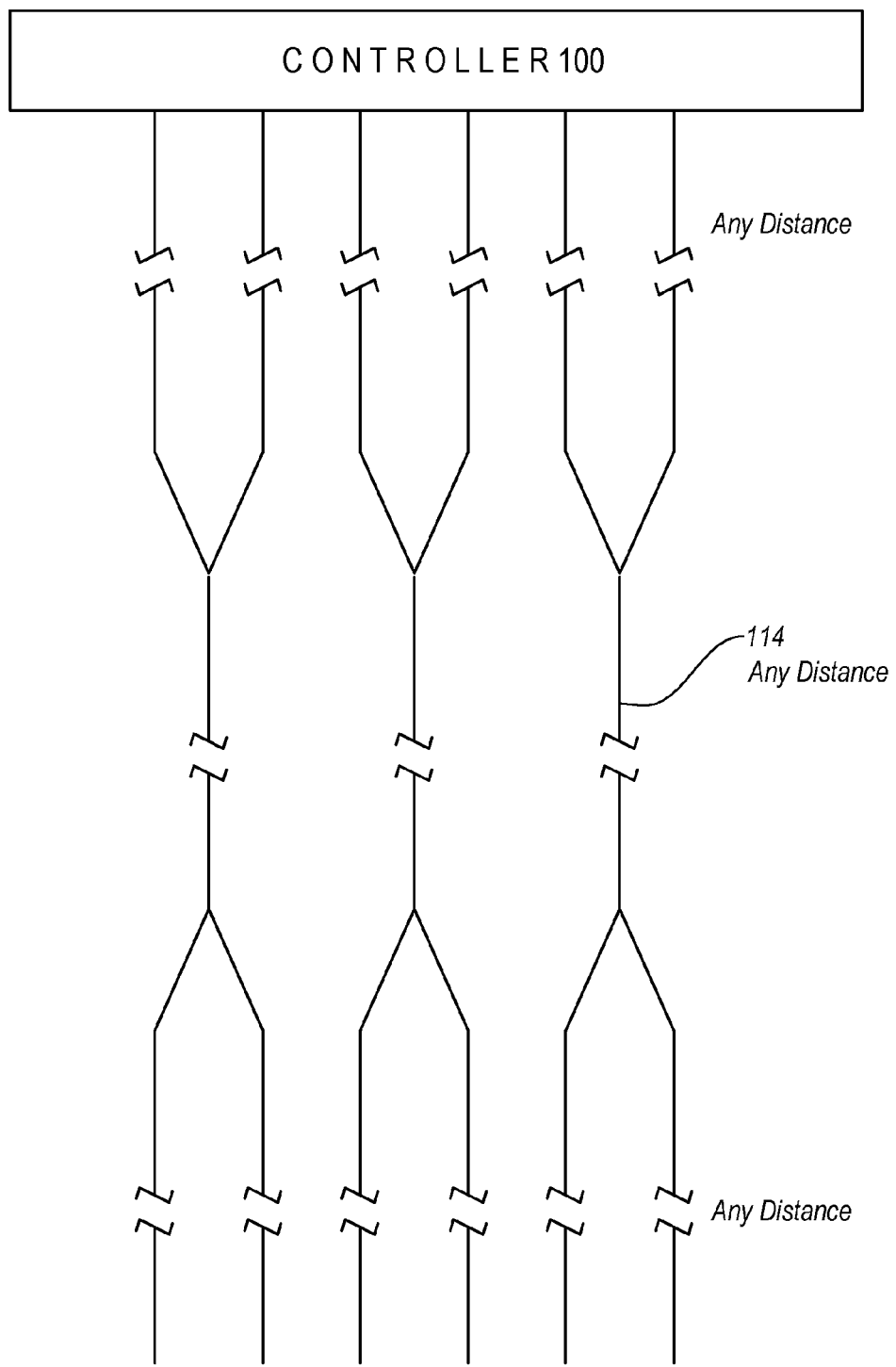
FIG. 4 is a simplied schematic of another embodiment of the present invention similar to that shown in FIGS. 2-3, which allows control of 6 valves over three "hot" electrically conductive lines.

As mentioned above, the distance of such segments 116 and 120 may be relatively short (e.g., about 6 inches to about 3 feet). Even shorter segments are of course possible (e.g., 2 inches, 3, inches, etc.). Any length is possible. The portion of segment 114 included with such a diode device may be similarly short. In addition, the distance between the inserted diode device and the valve (or controller) may be any length allowable subject only to the limitations of the electrical source. In some embodiments, this distance between the diode device and the controller or valve will be relatively short (e.g., about 2 inches to about 3 feet), or the segment of the device may be electrically connected directly to the valve or controller (see FIG. 4). As will be apparent, the diode device can be placed anywhere in the landscape to bypass a specific section of damaged wiring (e.g., if only a portion of a line is faulty, and the bounds of the faulty section are at least somewhat known, this section may be bypassed by inserting diode devices on either end). In such embodiments, both forked diode wiring devices may be inserted not necessarily adjacent the controller or the valves.

Figure 5:
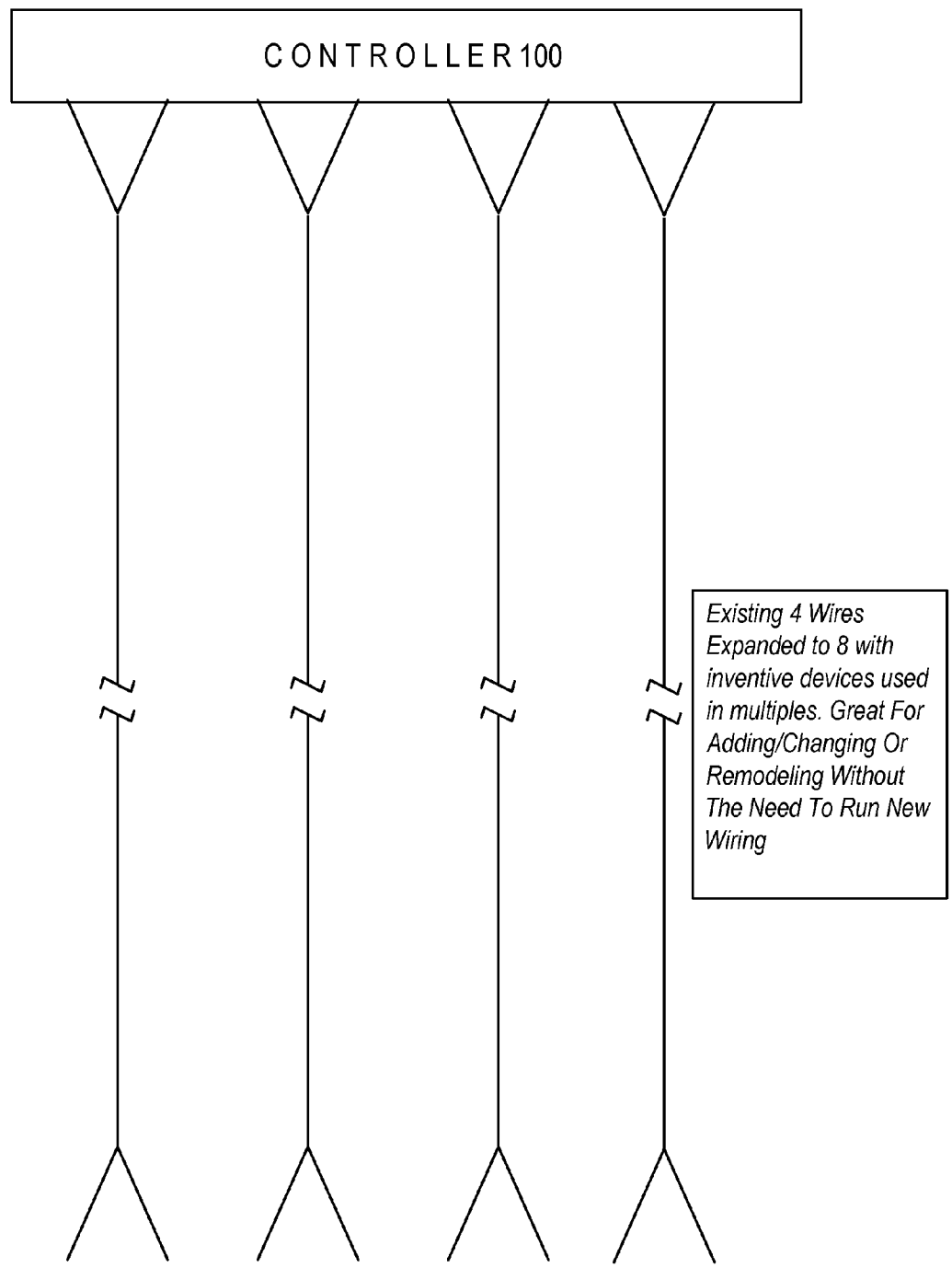
FIG. 5 is another simplied schematic of another embodiment of the present invention showing how where existing wires are not faulty, one may employ the present invention to doubly expand any number of wires to accommodate additional valves.

As shown in FIG. 5, in another embodiment the inventive diode device may be employed to expand the number of valves that can be controlled by a number of existing electrically conductive lines. For example, 4 lines can be expanded to 8 through use of the diode device without the need to run any new wiring, but by simply inserting the forked diode wiring devices at each end of the lines to be shared. It will be apparent that one may also employ the described methods and systems where there is both faulty wiring, and a desire to expand the number of valves, without providing any new wiring runs (e.g., one good wire can be shared to restore control over a valve having a faulty wire, while another good wire can be shared to expand the wire to control 2 valves).

Figure 3:
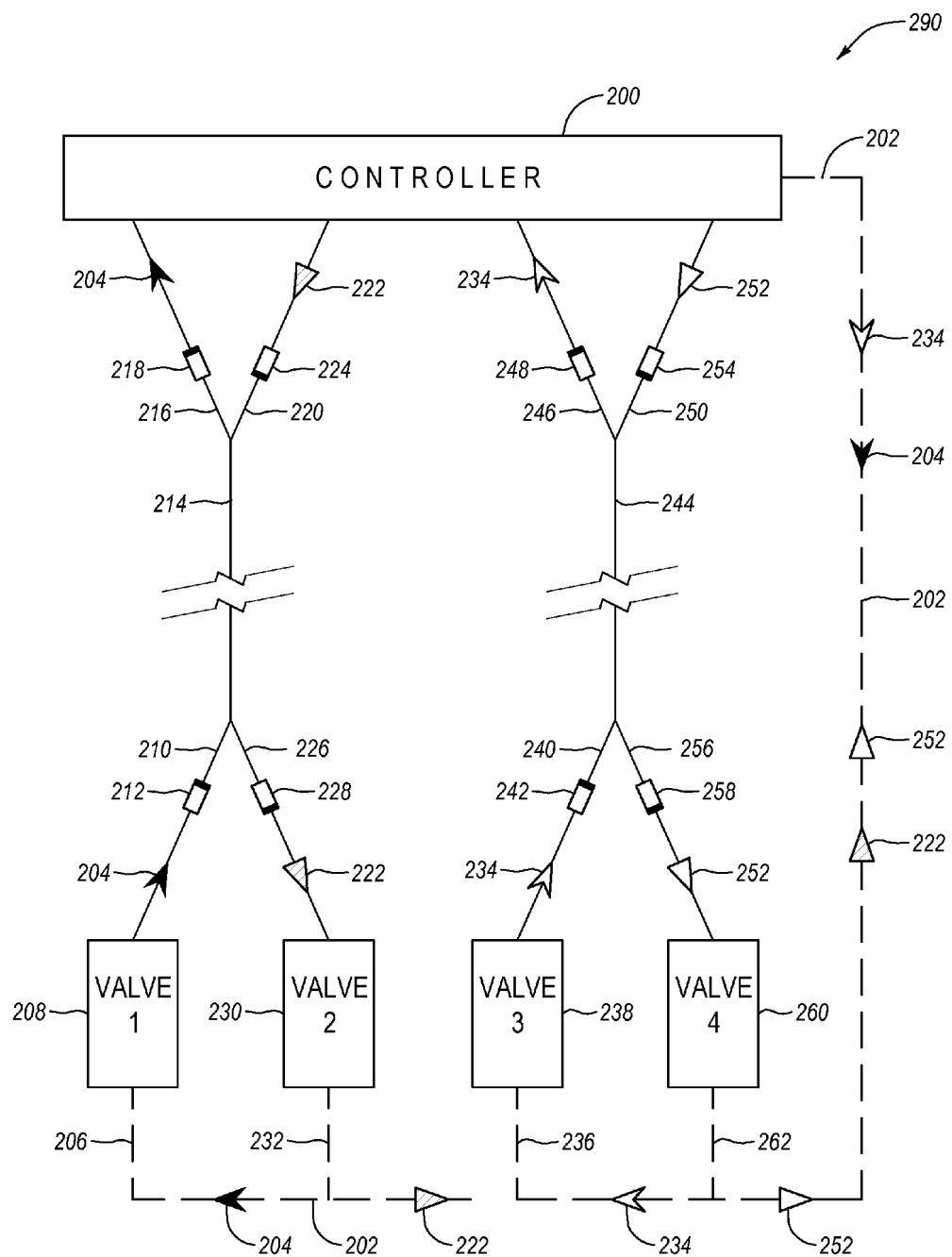
FIG. 3 is a schematic of another embodiment of the present invention similar to that shown in FIG. 2, but which is more complex as it includes four valves controlled over only two "hot" electrically conductive lines.

FIG. 3 is a schematic of another embodiment of the present invention similar to that shown in FIG. 2, but which is more complex in that system 290 includes four valves being controlled over only two identified non-faulty electrically conductive lines. Such a system may be employed in which two electrical lines of a 4 valve sprinkler system have become faulty. Of course, it could also be used in a system including more than 4 valves in which any two of the lines have become faulty. If only one electrical line were faulty, system 90 of FIG. 2 could be employed. The wiring and function of valves 208 and 230 are identical to that described above in conjunction with FIG. 2. In particular, direct current supplied by controller 200 flows from the controller 200 through common wire line 202 along line 202 in the direction of indicator arrow 204. Line 202 is connected to segment 206 which actuates valve 208. Segment 210 electrically connects valve 208, in the direction of indicator 204, to diode 212, which only allows current flow in the direction of indicator arrow 204. Segment 210 electrically connects to segment 214. Segment 214 is in turn electrically connected to segment 216, which includes diode 218, which only allows current flow in the direction of arrow 204. Segment 216 further connects to controller 200 to complete the circuit between controller 200 and valve 208.

The circuit for valve 230, begins with direct current supplied by the controller 200 to segment 220 including diode 224, which only allows current flow in the direction of indicator arrow 222. Segment 220 is electrically connected to shared segment 214. Shared segment 214 is then connected to segment 226, which includes diode 228, which only allows current and signal flow in the direction of arrow 222. Segment 226 electrically connects to valve 230. For the return path, valve 230, is connected in the direction of indicator 222 via segment 232 to common wire line 202. Line 202 is connected to the controller 200 in the direction of indicator 222 to complete the circuit to actuate valve 230.

Referring to the circuitry for valve 238, direct current supplied by the controller 200 flows from the controller 200 through common wire line 202 along the line in the direction of indicator arrow 234. Line 202 is connected to segment 236 which actuates valve 238. Segment 240 connects valve 238, in the direction of indicator 234, through diode 242, which is oriented to only allow current flow in the direction of arrow 234. Segment 240 is electrically connected to shared segment 244. Segment 244 is then connected to segment 246, including diode 248, which only allows current flow in the direction of indicator arrow 234. Segment 246 further connects to controller 200 in the direction of indicator 234 to complete the circuit for actuation of valve 238.

The circuit for valve 260 is also shown in FIG. 3. The circuit begins with direct current supplied by the controller 200 to segment 250 in the direction of indicator arrow 252. Segment 250 includes diode 254, which only allows current flow in the direction of arrow 252. Segment 250 is electrically connected to shared segment 244. Shared segment 244 is then connected to segment 256, which includes diode 258, establishing current flow only in the direction of arrow 252. Segment 256 further connects to valve 260. In the return path, valve 260 is connected to common line 202 in the direction of indicator 252 via segment 262. Line 202 is connected to the controller 200 to complete the circuit to actuate valve 260.

Although a particular orientation of diodes is illustrated, it will be understood that where the polarity of each diode is reversed, such a configuration would also be functional. The inventive sprinkler system wiring system and method of repair allows one to repair a faulty sprinkler system in which a hot electrically conductive line (or the common line) between a controller and a corresponding valve is faulty by identifying the faulty line(s), identifying non-faulty line(s), inserting a forked electrically conductive line into one end of the non-faulty electrically conductive line adjacent the controller, and inserting another forked electrically conductive line into the other end of the non-faulty electrically conductive line adjacent the valves. Each forked electrically conductive line includes a diode within each of the two forks, as illustrated and described in conjunction with FIGS. 2 and 3 so as to prevent interference from one valve to another where the non-faulty line is shared between two valves.

Such systems and methods may be employed in any conceivable sprinkler system including at least two valves (e.g., 2, 3, 4, 5, 6, or more) where one or more pairs of valves may be rewired so as to share a non-faulty electrically conductive line. In circumstances where the common line has become faulty, a line previously assigned as a "hot" line may be reassigned as the common line, while a remaining non-faulty line may be shared between two valves. Of course, the systems and methods could also be used in systems including 2 or more valves in which any one or more of the lines have become faulty.

Although described in conjunction with repair of sprinkler systems, it is envisioned that the wiring system including diodes could be used in other fields that may include a similar problem. For example, any system including a controller which sends signals to an actuator (e.g., whether a valve or other type actuator) that is controlled through a solenoid or other actuation mechanism which is not dependent on the direction of current or signal flow from the controller to the valve or other actuator may similarly benefit from the present invention in which a non-faulty electrically conductive line is identified, a faulty electrically conductive line is identified, and the described forked segments including diodes on each segment are inserted into both the controller end and the valve or other actuator end of the non-faulty line in order to share the non-faulty line between two valves or other actuators. Based on the foregoing description, it will be apparent that in one embodiment, the forked diode devices may be provided (e.g., sold) and used in pairs (e.g., one for insertion into the controller end, one for insertion into the valve end of an existing wiring structure).

Although described in the context of sprinkler systems that may typically operate at about 24 volts, it will be understood that other systems that may benefit from the described concepts may operate at different voltages, for example greater than 0 (e.g., 0.0001 volt) to up to 50,000 or more volts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sprinkler system comprising:
A plurality of sprinkler valves;
a controller for controlling the plurality of sprinkler valves;
a first hot electrically conductive line having electrical continuity between the controller and a corresponding first valve, the first hot electrically conductive line comprising a first segment, a second segment, and a third segment, the first segment electrically connecting the controller to the second segment, the second segment electrically connecting the first segment to the third segment, and the third segment electrically connecting the first valve to the second segment;
a second hot electrically conductive line having electrical continuity between the controller and a corresponding second valve, the second hot electrically conductive line comprising a first segment, a second segment, and a third segment, the first segment electrically connecting the controller to the second segment, the second segment electrically connecting the first segment to the third segment, and the third segment electrically connecting the second valve to the second segment;

wherein the second segment of the second hot electrically conductive line is the second segment of the first hot electrically conductive line so that the second segment is shared and includes forks at both a controller end and a valve end; a plurality of electrical diodes including a pair of first segment diodes and a pair of third segment diodes in which;

a first segment diode is disposed on each first segment between the controller and the fork at the intersection of the second segment with the first segments;

a third segment diode is disposed on each third segment between the corresponding valve and the fork at the intersection of the second segment with the third segments; and a common electrically conductive line having electrical continuity between the controller, the first valve, and the second valve.

2. A sprinkler system as recited in claim 1, wherein the first and second valves are disposed adjacent to one another.

3. A sprinkler system as recited in claim 2, wherein the first and second valves are disposed within the same valve box.

4. A sprinkler system as recited in claim 1, wherein the first and third segment diodes of a given hot electrically conductive line are oriented in the same direction as one another.

5. A sprinkler system as recited in claim 4, wherein the first and third segment diodes of the first hot electrically conductive line are oriented in a first same direction as one another and the first and third segment diodes of the second hot electrically conductive line are both oriented in a second direction that is opposite that of the first and third segment diodes of the first hot electrically conductive line.

6. A method of repairing a faulty sprinkler system in which a hot electrically conductive line between a controller and a corresponding valve is faulty, the method comprising:

identifying the faulty electrically conductive line having at least one electrical discontinuity between the controller and a corresponding first valve; and identifying a non-faulty electrically conductive line having electrical continuity between a controller and a corresponding second valve; and inserting a forked electrically conductive line including three segments into one end of the non-faulty electrically conductive line adjacent the controller, between the controller and the corresponding second valve, the forked electrically conductive line including a first segment providing an electrical connection to the controller for the first valve, a second segment providing an electrical connection to the controller for the second valve, and a third segment that provides an electrical connection to the non-faulty electrically conductive line, wherein the first and second segments each include an electrical diode between the controller and the non-faulty electrically conductive line; and inserting a forked electrically conductive line including three segments into another end of the non-faulty electrically conductive line, adjacent the second valve, the forked electrically conductive line including a first segment providing an electrical connection between the non-faulty electrically conductive line and the first valve, a second segment providing an electrical connection between the non-faulty electrically conductive line and the second valve, and a third segment that provides an electrical connection between the non-faulty electrically conductive line and the forked first and second segments, wherein the first and second segments each include an electrical diode between the corresponding valve and the non-faulty electrically conductive line.

7. A method as recited in claim 6, wherein the first and second valves are disposed adjacent to one another.

8. A method as recited in claim 7, wherein the first and second valves are disposed within a same valve box.

9. A method as recited in claim 6, wherein the diodes of the first and second segments adjacent the controller are oriented in opposite directions relative to one another.

10. A sprinkler system as recited in claim 9, wherein the diodes of the first and second segments adjacent the controller are oriented in opposite directions relative to one another and the diodes of the first and second segments adjacent the valves are also oriented in opposite directions relative to one another, and further wherein each diode of each first segment is oriented in the same direction as one another and each diode of the second segment is oriented in the same direction as one another.

* * * * *